United States Patent [19]

Schiff

[11] 4,039,308
[45] Aug. 2, 1977

[54] AIR FILTER

[76] Inventor: Edward Paul Schiff, 18823 Martha St., Tarzana, Calif. 91356

[21] Appl. No.: 612,191

[22] Filed: Sept. 10, 1975

Related U.S. Application Data

[63] Continuation-in-part of Ser. No. 508,037, Sept. 23, 1974, abandoned.

[51] Int. Cl.² .................................................. B01D 39/00
[52] U.S. Cl. ........................................ 55/505; 55/521; 55/522; 55/529
[58] Field of Search ........................ 55/500, 505–509, 55/522, 521, 529

[56] References Cited

U.S. PATENT DOCUMENTS

| 2,799,357 | 7/1957 | Warnecke et al. | 55/504 |
| 2,920,717 | 1/1960 | Tuttle et al. | 55/504 |
| 3,123,456 | 3/1964 | Boltz et al. | 55/522 |
| 3,281,513 | 10/1966 | Stripp et al. | 55/502 |
| 3,722,186 | 3/1973 | Parker et al. | 55/505 |

*Primary Examiner*—Bernard Nozick
*Attorney, Agent, or Firm*—William L. Androlia

[57] ABSTRACT

A rigid foam hemisphere attaches to the air inlet of cylindrical convex air rigid foam straightener and to internal combustion engine to define air filter therefor.

5 Claims, 4 Drawing Figures

AIR FILTER

This is a continuation-in-part of an application for U.S. Letters patent Ser. No. 508,037 filed Sept. 23, 1974, now abandoned.

FIELD OF THE INVENTION

This device relates to an air cleaner and more particularly to devices for cleaning and straightening the air.

DESCRIPTION OF THE PRIOR ART

Internal combustion engines frequently require air filters coupled to their air intake to protect the engine from damage caused by solid particles contained in the unfiltered air. Also, internal combustion engines are frequently fitted with devices between the air filter and air intake to straighten the airflow thereby reducing the turbulence of the air entering the air intake for increasing the efficiency of operation of the engine.

Presently, there exist in the prior art air cleaning devices. Also, means for straightening the airflow thereby reducing the intake turbulence exist in the prior art. A velocity stack is such a device. Since the air cleaner and straightening means perform separate and distinct functions, both are required if one desires both functions. This combination of separate and distinct functions has a disadvantage in that the air cleaner size is dictated by the amount of required filtered air. Accordingly, if a large amount of filtered air is required, the air cleaner portion will be large thereby making the combination large.

Accordingly, it is a general object of the present invention to provide an integrated air cleaning and straightening means.

It is another object of the present invention to provide an air cleaning and straightening means which is relatively small in size.

SUMMARY OF THE INVENTION

In keeping with the principles of the present invention, the objects are accomplished by modifying the air straightening means. The air straightening means is modified by manufacturing same from a porous material similar to that utilized in the air cleaner. Therefore, air filtration is not only performed by the air cleaner but also by the air straightening and turbulence reducing means thereby greatly increasing the available amount of filtered air at the air intake of the internal combustion engine without substantially increasing the size of the air cleaner.

BRIEF DESCRIPTION OF THE DRAWINGS

The above-mentioned and other features and objects of the present invention will become more apparent by reference to the following description taken in conjunction with the accompanying drawing and in which.

DESCRIPTION OF THE PREFERRED EMBODIMENT

Figure 1:
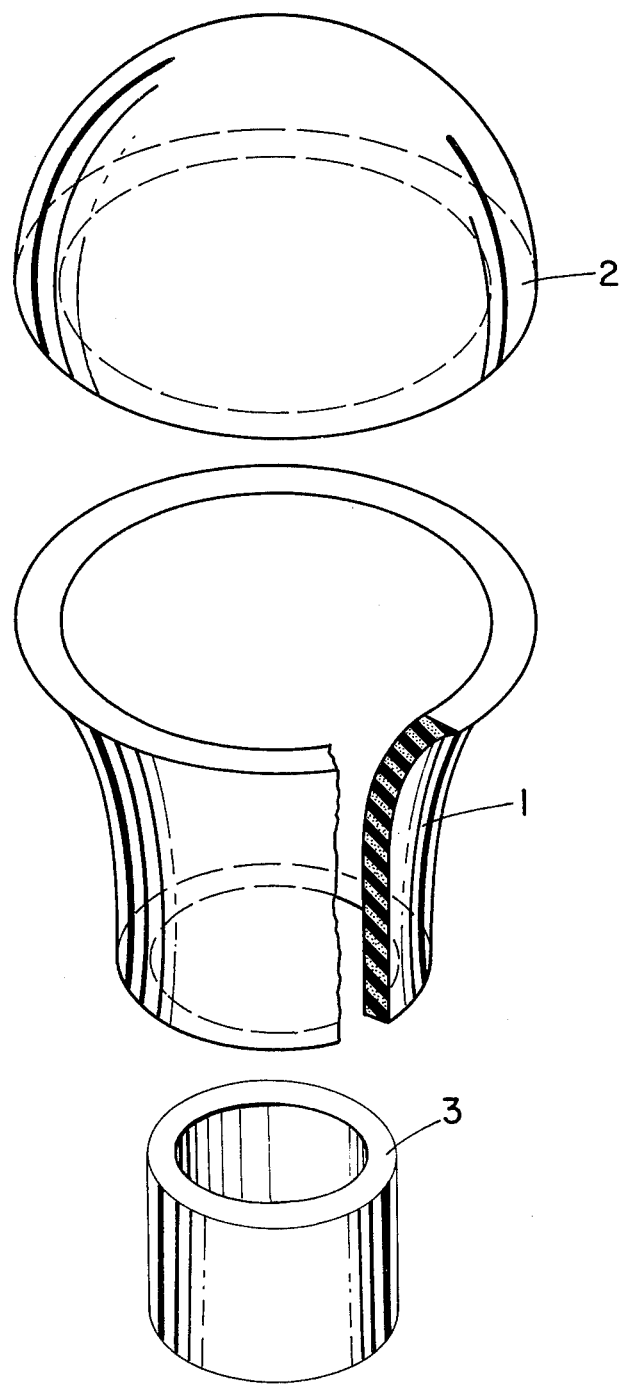
FIG. 1 is a simplified exploded pictorial view of multi-purpose air filtration device in accordance with the teachings of the present invention.
Figure 2:
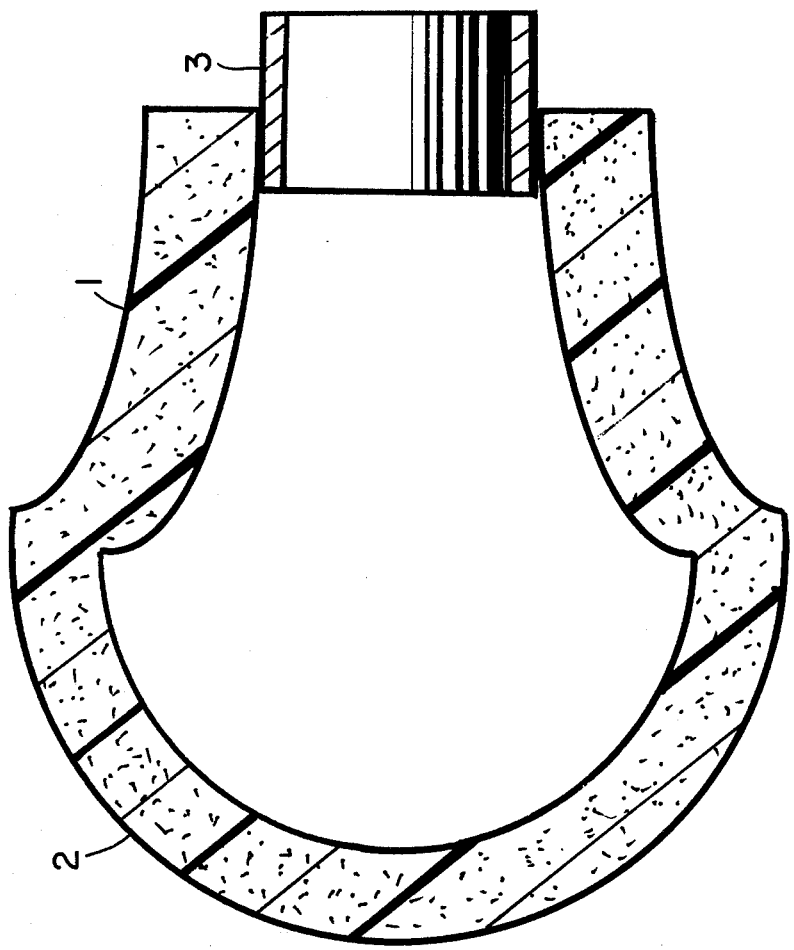
FIG. 2 is a cross sectional view of a multi-purpose air filtration device in accordance with the teachings of the present invention.

Referring more specifically to the drawings, FIG. 1 is a simplified exploded pictorial view of multipurpose air filtration device in accordance with the teachings of the present invention. FIG. 2 is a cross-sectional view of an air filtration device in accordance with the teachings of the present invention. FIG. 1 and FIG. 2 taken together contain sufficient detail to set forth the implementation of an embodiment of the present invention.

Figure 4:
FIG. 4 is a cross-sectional view of the multiple element of FIG. 3.

Referring to FIG. 1 and FIG. 2, the air filtration device includes an air straightening means 1. Air straightening means 1 is made of a porous material through which atmospheric air is filtered and is of a shape which straightens and reduces the turbulence of air passing through it. In particular, as shown in FIGS. 1, 2 and 4, the shape of the air straightening means 1 in the preferred embodiment is a cylinder of revolution of a continuous curve defining a convex cylinder. Furthermore, the preferred continuous curve is a quarter elipse. If the porous material is rigid, then no supporting framework is necessary. Otherwise, a supporting framework (not shown) is necessary. The smaller diameter end of the air straightening means 1 is coupled to an air intake 3 as shown in FIG. 2. In practice, the air straightening means 1 can be in the shape of a velocity stack.

The air intake 3 may be any air intake device, such as the inlet to a supercharger, carburetor, fuel injection, flexible ducting to an air intake, etc. Air intake 3 has a central hole to pass the air from straightening means 1.

Air filter 2 closes the larger diameter end of the air straightening means 1 as shown in FIG. 2. In practice, the air filter of FIG. 2 can be hemispherical in shape and an integral part of the air straightening means 1 as shown in FIG. 2 and may be formed out of the same material as that of air cleaner 2. Furthermore, the air filtration device may be made from a resilient filtering material and be coupled to air intake 3 by making the smaller diameter end of air straightening means 1 an interference fit with the outside diameter of air intake 3.

In operation, filtered air flows into the air intake 3 from two sources. First, air flows through and is filtered by the air cleaner 2. The filtered air from the air cleaner 2 is straightened by the air straightening means 1 and flows into the air intake 3. Second, air flows through and is filtered by the porous air straightening means 1. This filtered air from the air straightening means 1 also flows into the air intake 3. Since not only the air cleaner 2 but also the air straightening means 1 is a source of filtered air, the size of the air cleaner 2 can be substantially reduced. Furthermore, since the air filtration device includes an air straightening means 1, the air flowing into air intake 3 is straightened and the turbulence reduced. Since the air is straightened and the turbulence reduced, gas mixing device (not shown) coupled to air intake 3 operates more efficiently.

Figure 3:
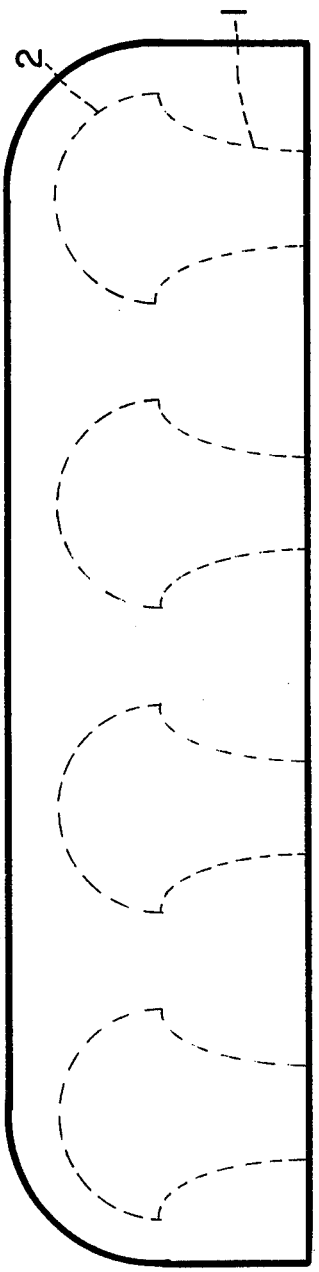
FIG. 3 is a side view of a multiple element multipurpose air filtration device in accordance with the teachings of the present invention.

It should be apparent to one skilled in the art that the within invention can be extended to a multi-element air filtration device 4 as shown in FIG. 3 and FIG. 4. It should also be apparent that the shape of the interior of each element of the multi-element air filtration device is the essential part of the within invention and the exterior shape has substantially no effect upon the performance of each element. In practice, the air filtration device can be formed by cutting each element in a piece of foam with a hot wire.

In all cases it is understood that the above-described embodiments are merely illustrative of but a small number of the possible specific embodiments which can represent applications of the principles of the present invention. Numerous and varied other arrangements can be readily devised in accordance with these principles by those skilled in the art without departing from the spirit and scope of the invention.

I claim:

1. An apparatus for an air input of an internal combustion engine, comprising:

porous air straightener of rigid foam, said air straightener having an input and an output end, said output end being smaller in diameter than said input end, said air straightener further having an interior surface which is a cylinder of revolution of a continuous curve defining a convex cylinder, said cylinder of revolution having a cross-sectional area which continuously decreases from said input end to said output end; and porous air cleaner of rigid foam closing the input end of said porous air straightener, said air cleaner further being of substantially hemispherical shape and an integral part with said air straightener;

whereby the air flowing through said air cleaner and said air straightener is straightened before entering said air input.

2. An apparatus for an internal combustion engine according to claim 1 wherein surface of revolution of the porous air straightener is in the shape of a velocity stack.

3. An apparatus for an internal combustion engine according to claim 2 wherein said intake forming an interference fit with the output end of said velocity stack thereby coupling said air straightener and air cleaner to said air intake without a clamp.

4. An apparatus for an internal combustion engine according to claim 2 wherein the porous air straightener and air cleaner are made from a poly-vinyl chloride foam.

5. An apparatus for an internal combustion engine according to claim 4 wherein said continuous curve is a quarter elipse.

* * * * *